United States Patent [19]

Miron et al.

[11] Patent Number: 5,639,530

[45] Date of Patent: Jun. 17, 1997

[54] RETROREFLECTIVE ARTICLES COMPRISING A NON-THERMOPLASTIC HYDROCARBON ELASTOMER ADHESIVE LAYER FOR LIFE SAVING DEVICES AT SEA

[75] Inventors: Gary R. Miron; Thanh-Huong Thi Nguyen, both of St. Paul, Minn.

[73] Assignee: Minnesota Mining and Manufacturing Company, St. Paul, Minn.

[21] Appl. No.: 491,128

[22] Filed: Jun. 16, 1995

[51] Int. Cl.$^6$ .................................................. G02B 5/124
[52] U.S. Cl. ..................... 428/40.1; 359/515; 359/536; 428/40.2; 428/40.9; 428/42.1; 428/67; 428/323; 428/325; 428/327; 428/328; 428/254; 428/457; 428/480; 428/492; 428/355 BL
[58] Field of Search .......................... 428/40, 343, 355, 428/354, 323, 327, 328, 325, 480, 457, 492, 494, 40.1, 40.2, 40.9, 42.1, 67; 359/515, 536

[56] References Cited

U.S. PATENT DOCUMENTS

| | | | |
|---|---|---|---|
| 2,407,680 | 9/1946 | Palmquist et al. | 88/82 |
| 2,956,904 | 10/1960 | Hendricks | 117/93 |
| 3,140,340 | 7/1964 | Weber | 88/82 |
| 3,190,178 | 6/1965 | McKenzie | 88/82 |
| 3,648,348 | 3/1972 | Freimuth | 29/200 B |
| 3,684,348 | 8/1972 | Rowland | 350/103 |
| 4,025,159 | 5/1977 | McGrath | 350/105 |
| 4,511,210 | 4/1985 | Tung et al. | 350/105 |
| 4,576,850 | 3/1986 | Martens | 428/156 |
| 4,588,258 | 5/1986 | Hoopman | 350/103 |
| 4,664,966 | 5/1987 | Bailey et al. | 428/203 |
| 4,775,219 | 10/1988 | Appeldorn et al. | 350/103 |
| 4,801,193 | 1/1989 | Martin | 350/103 |
| 4,805,984 | 2/1989 | Cobb, Jr. | 350/96.28 |
| 4,895,428 | 1/1990 | Nelson et al. | 350/103 |
| 4,896,943 | 1/1990 | Tillver et al. | 350/105 |
| 4,906,070 | 3/1990 | Cobb, Jr. | 350/286 |
| 4,938,563 | 7/1990 | Nelson et al. | 350/103 |
| 4,950,525 | 8/1990 | Bailey | 428/164 |
| 5,056,892 | 10/1991 | Cobb, Jr. | 359/831 |
| 5,064,272 | 11/1991 | Bailey et al. | 359/541 |
| 5,066,098 | 11/1991 | Kult et al. | 359/540 |
| 5,069,964 | 12/1991 | Tolliver et al. | 428/325 |
| 5,138,488 | 8/1992 | Szczech | 359/529 |
| 5,175,030 | 12/1992 | Lu et al. | 428/30 |
| 5,183,597 | 2/1993 | Lu | 264/1.4 |
| 5,229,882 | 7/1993 | Rowland | 359/530 |
| 5,236,751 | 8/1993 | Martin et al. | 428/40 |
| 5,272,562 | 12/1993 | Coderre | 359/529 |
| 5,376,431 | 12/1994 | Rowland | 428/164 |
| 5,405,675 | 4/1995 | Sawka | 428/343 |
| 5,453,320 | 9/1995 | Harper | 428/356 |

FOREIGN PATENT DOCUMENTS 0 488 526 B1   11/1994   European Pat. Off. .
6-280221       10/1994   Japan .
WO 94/11175    5/1994    WIPO .

OTHER PUBLICATIONS

Dictionary of Rubber, K.F. Heinisch, p. 359, John Wiley U Sons, New York (1974).

Code of Federal Regulations, 46 parts 156 to 165, Revised as of Oct. 1, 1993 Retroreflective Material for Lifesaving Equipment.

Federal Registrar, Solas—U.S. Coat Guard, vol 44, No. 128, Jul. 2, 1979, Rules and Regulations, Technical Specification for Retroreflective Material for Use on Life–Saving Appliances.

*Primary Examiner*—Nasser Ahmad
*Attorney, Agent, or Firm*—Gary L. Griswold; Walter N. Kirn; Robert H. Jordan

[57] ABSTRACT

Retroreflective articles for life saving devices at sea are described comprising a layer of a pressure-sensitive adhesive made using a solvent-free hot melt process which employs as starting material a tackified non-thermoplastic hydrocarbon elastomer. The process employs a continuous compounding device that has a sequence of alternating conveying and processing zones.

16 Claims, 2 Drawing Sheets

RETROREFLECTIVE ARTICLES COMPRISING A NON-THERMOPLASTIC HYDROCARBON ELASTOMER ADHESIVE LAYER FOR LIFE SAVING DEVICES AT SEA

BACKGROUND OF THE INVENTION

1. Field of the Invention

This invention relates to retroreflective articles comprising a pressure-sensitive, lightly or non-crosslinked adhesive layer made by a solvent free, hot melt process from a tackified, amorphous hydrocarbon elastomer which adheres to a wide variety of substrates adapted for life saving devices at sea without the need of a primer.

2. Related Art

Retroreflective articles have many uses. Often it is desired to adhere retroreflective articles to other articles, thereby making a portion of the second article visible at night or in inclement weather. If an adhesive is to be used to adhere the retroreflective article to the second article, the environmental conditions must be taken into consideration.

Retroreflective articles may be used to reflectorize life saving devices, such as, for example, life vests and jackets used in marine settings, i.e., conditions of high humidity and/or water immersion. In these conditions, the current technology to reflectorize these materials is to first apply a solvent-based adhesive primer to the material. Then an acrylic or highly tackified synthetic rubber adhesive-backed retroreflective article is applied to the primed area. The adhesive primer is required in order that the retroreflective article remain on the vest under high humidity and/or water immersion conditions. The current adhesive primers (for example that known under the trade designation E-44, available from assignee) are found to work only on selected substrates, and are not preferred by the user because of their odor and additional application time (applying the primer onto the substrate and waiting for the primer to dry). Life vests, life jackets and life rafts, for example, may comprise a number of different materials, including one or more of the following: polymer coated fabric (such as plasticized polyvinylchloride coated fabric, rubber coated cloth and the like), vinyl film/nylon cloth laminates, cotton drill, fiberglass, polyolefin film, vinyl film, and the like. It would be preferred if a retroreflective article were available having a pressure-sensitive adhesive thereon that would adhere to a variety of life-saving device fabrics, without the need of a primer.

SUMMARY OF THE INVENTION

In accordance with the present invention, a retroreflective article for life saving devices at sea (SOLAS) is presented which comprises a layer of pressure-sensitive adhesive as described in assignee's world patent application WO 94/11175 on a non-light-impinging surface of the article.

The articles of the invention are useful for reflectorizing SOLAS by adhering a retroreflective sheeting to a variety of materials. The adhesive allows the SOLAS to exhibit sufficient tolerance to water immersion to pass tests demanded of such articles, without the aid of a primer.

In particular, the retroreflective articles of the invention comprise:

(a) a retroreflective sheeting comprising a light-impinging surface and a non-light-impinging surface; and (b) a layer of pressure-sensitive adhesive disposed on at least a portion of the non-light-impinging surface, the adhesive derived from an amorphous hydrocarbon elastomer using a solventless hot melt process, the adhesive comprising:

(i) rubber having a glass transition temperature ranging from about $-120°$ C. to about $-50°$ C.; and (ii) tackifier having a ring and ball softening point ranging from about $70°$ C. and $140°$ C., the adhesive comprising from about 60 to about 125 parts by weight of tackifier per 100 parts by weight of rubber. The rubber is preferably lightly crosslinked (preferably by electron beam) but not to the point of insolubility in toluene. A small weight percentage of chemical crosslinker such as a phenolic resin may be used to increase molecular weight of the rubber, as an alternative to electron beam.

Preferably, the adhesive is present at a coating weight ranging from about 20 to about 40 grains per 4 inch by 6 inch (about 80 to about 170 grams per square meter (gsm)), more preferably from about 30 to about 40 grains per 4 inch by 6 inch (about 120 to about 170 gsm). Preferably a liner material is adhered to the adhesive so that the article may be made available in roll form.

Preferably the adhesive is used to adhere the retroreflective sheeting to a variety of substrates, such as vinyl-coated nylon cloth.

For retroreflective articles of the invention the adhesive layer is adhered to the non-light-impinging surface of the retroreflective article (i.e., that surface of the retroreflective article which does not receive incident light when the article is used for its intended purpose). Such non-light-impinging surface may include i) a sealing film (preferably polyester, polyolefin, polyvinylchloride or polycarbonate) attached to a transparent retroreflective sheeting having a substantially flat surface and a structured second surface, the structured second surface comprised of a plurality of grooves (parallel or intersecting) defining a plurality of peaks, ii) a metallized surface of a retroreflective sheeting having a substantially flat surface and structured second surface, the structured surface having a layer of metal thereon, or iii) a binder layer of a beaded retroreflective sheeting (i.e., retroreflective sheetings comprising a plurality of transparent microbeads).

The PSAs useful in the invention are preferably produced by a process which permits the processing of amorphous hydrocarbon elastomers, especially high molecular weight amorphous hydrocarbon elastomers, without the need to employ either organic solvents or low molecular weight plasticizing aids. The process produces PSAs by solvent-free compounding of tackified amorphous hydrocarbon elastomers. The process employs a continuous compounding device and hot melt processing techniques. The adhesive composition can be compounded without separate batch pre-mastication of the elastomer and without the use of significant amounts of plasticizing aids to reduce the viscosity of the composition to render it processable. Additionally, the adhesive composition can be applied to a moving web directly from the comporting device so as to provide a continuous method for the manufacture of the articles of the invention. The process can accommodate even high molecular weight hydrocarbon elastomers, for example viscosity average molecular weight $MW_v$ of 250,000 or more.

The process can employ either aerobic or anaerobic processing. For purposes of this invention, aerobic processing means that a gas which contains available oxygen (such as compressed air) is intentionally injected into the compounding device so as to promote oxidative breakdown of the hydrocarbon elastomer. Anaerobic processing means that no oxygen-available gas is intentionally injected into the compounding device. However, minor amounts of air may be present in anaerobic processing in the practice of the invention.

Aerobic processing may be advantageously utilized when the hydrocarbon elastomer will preferentially undergo chain scission rather than crosslinking and/or chain extension. Aerobic processing allows a greater reduction in the molecular weight of the elastomer in a relatively short period of time. Additionally, aerobic processing allows manufacture at lower temperatures. As a result, thermally sensitive materials may be compounded with the hydrocarbon elastomer in the process of the invention.

Anaerobic processing may be advantageously utilized when elastomers which crosslink under oxidative conditions are used. This mitigates the problem of these elastomers crosslinking during processing. Anaerobic processing may also be used with elastomers that do not crosslink under oxidative conditions so as to achieve a higher molecular weight than would be achieved under aerobic conditions. This increases the cohesive strength of the adhesive and minimizes the degree of later crosslinking needed to provide enhanced cohesive strength. Anaerobic processing of either type of elastomer also results in adhesives having lower odor and lighter color.

A preferred process of making PSAs useful in the invention employs a continuous compounding device that has a sequence of alternating conveying and processing zones. The elastomer is continuously conveyed from one zone to the other by the device. The processing zones are capable of masticating the elastomer. They are also capable of mixing additives into the elastomer.

In the preferred process, an amorphous elastomer is fed to a first conveying zone of the compounding device. This first zone transports the elastomer to a first processing zone where the elastomer is masticated. The masticated elastomer is then transported to a second conveying zone where a tackifier is added and the mixture of the two is carried to a second processing zone where the tackifier and the masticated elastomer are mixed together to form a blend of the two materials. The blend can then be discharged from the compounding device and stored for later use. Alternatively, the blend can be applied to a web, preferably a moving web, in the form of a thin film.

In order to facilitate the description of the invention, the following terms used herein shall have the following meanings:

SOLAS is an acronym for safety of life at sea, and shall mean retroreflective articles comprising a beaded or cube-corner retroreflective sheeting having a layer of non-thermosettable PSA on its non-light impinging surface.

PVC component includes PVC coated fabrics and PVC articles devoid of fabric. Particularly preferred are highly monomerically plasticized PVC components, such as PVC coated fabrics.

An amorphous hydrocarbon elastomer shall mean a hydrocarbon homopolymer or copolymer as distinguished from a block copolymer.

Pressure-sensitive adhesive (PSA) shall mean an adhesive which is normally tacky at room temperature and adheres to a surface upon mere contact to the surface without the need for more than finger or hand pressure.

Tackifier shall mean a material which is miscible with at least one hydrocarbon elastomer, has a number average molecular weight $MW_n$ of 10,000 grams per mol (g/mol) or less and a glass transition temperature ($T_g$) of −30° C. or more as measured by differential scanning calorimetry (DSC).

Plasticizing aid shall mean a material which has a $MW_n$ of less than 50,000 g/mol and a ($T_g$) of less than −30° C. as measured by DSC.

Further aspects and advantages of the invention will become apparent from the following description of the invention.

DESCRIPTION OF PREFERRED EMBODIMENTS

The invention provides retroreflective articles comprising a pressure-sensitive adhesive (PSA) on a non-light-impinging surface. The articles of the invention, by virtue primarily of the adhesive, pass a number of rigorous tests, and preferably all tests, further described herein, which are used to determine if the articles will withstand adhesion testing after water soaking including salt water. Many previously known adhesives have either not shown the ability to meet these tests, or can do so only with the aid of an adhesive primer. The pressure-sensitive adhesives useful in the invention and the inventive articles are now described with reference to the drawing figures.

I. Adhesive Layer

PSAs useful in the invention are preferably produced by a process employing a continuous compounding device. A number of such devices are known. They may comprise a single unit or a series of units interconnected so as to continuously process the elastomer. The device has a sequence of alternating conveying and processing sections which are interconnected. An example of a continuous compounding device useful in the present invention is a twin screw extruder having a sequential series of conveying and processing zones. A plurality of input openings are preferably provided along the length of the extruder to facilitate the addition of various materials such as tackifier resins, fillers, antioxidants, plasticizing aids (if desired), radiation enhancers such as electron beam sensitizers and photoinitiators, light stabilizers and other adjuvants known in the art. Additions of material, whether elastomer, tackifier, or other adjuvants, are made through input ports to a partially full conveying zone or zones. A melt pump and filter may be present either as an integral part of the extruder, or as a separate unit to facilitate both the removal of the adhesive from the compounding device and the removal of unwanted contaminants from the adhesive stream.

In the practice of the process, the elastomer is added to a first conveying zone of the compounding device at a controlled rate so that the elastomer does not completely fill the zone. The elastomer may be pelletized by grinding or extrusion pelletization prior to being fed to the compounding device. Alternately, it may be fed directly into the compounding device without grinding or pelletization using a device such as a Moriyama extruder. If the elastomer has been pelletized, it is preferably treated with a material such as talc to prevent agglomeration of the pellets.

The elastomer is then transported by the first conveying zone to a first processing zone where it is masticated. The first processing zone typically is designed to be essentially completely full and to masticate the elastomer. Additionally, the processing zone conveys the elastomer to the next zone. It may be desirable to provide the first processing zone as at least two discrete processing sections separated from each other by a transporting section. This permits the elastomer to be masticated in steps, with cooling of the masticated elastomer between each step.

If two or more elastomers are to be processed they may both be added to the first conveying zone and masticated in the first processing zone. Alternatively, the elastomers may be added sequentially to different conveying zones with sequential mastication after each elastomer addition. Sequential elastomer addition to different conveying zones may also be employed when a single elastomer is used.

Mastication is preferably carried out in the absence of materials which will lubricate the elastomer and prevent reduction of its molecular weight. This does not however, preclude the presence of small mounts of such materials, provided that the amount present does not effectively reduce the rate of mastication. Certain other solid adjuvants, such as talc, inorganic fillers, antioxidants, and the like, may be fed to the compounding device such that they are present during mastication.

The masticated elastomer then passes from the first processing zone to a second conveying zone. As with the first conveying zone, the second conveying zone is not completely filled by the elastomer. Tackifier, and optionally other additives, are fed to the second conveying zone. The resulting mixture is conveyed to the next processing zone where they are mixed to form a blend of the materials. A number of techniques may be used to feed these materials to the compound device. For example, a constant rate feeder such as a K-Tron loss-in weight feeder may be used to add solid materials. Heated pail unloaders, gear pumps, and other appropriate equipment for feeding liquids at a controlled rate may be used to feed the liquids to the compounding device. Additives present at low concentration may be pre-blended with one or more of the other components for more accurate addition.

Although substantially all mastication occurs in the first processing zone, there may be some mastication which occurs in subsequent processing of the elastomer through the compounding device. This additional mastication may occur in subsequent conveying or processing zones. In any event, the degree to which the elastomer must be masticated in the practice of the invention varies with each elastomer employed and the finished product desired. Generally, the elastomer must be sufficiently masticated to (i) permit subsequently added tackifiers and any other adjuvants to be satisfactorily mixed into the elastomer to form a blend and (ii) to permit the blend to be extruded as a stream that is essentially free from both rubber particles and from visually identifiable regions of unmixed tackifier and any other adjuvants.

Once the masticated elastomer, tackifier, and any other adjuvants have been formed into the blend, the composition may now be referred to as an adhesive. This adhesive typically has a viscosity at the processing temperature in the range from 500 Poise to 5000 Poise (measured at a shear rate of 1000 $sec^{-1}$). Higher viscosity adhesives may also be processed in the process of the invention. The processing temperature of the adhesive is typically in the range of 100°–200° C.

The adhesive may be discharged from the compounding device into a storage container for later additional processing or use. Alternatively, it may be discharged directly onto a support (for example a liner, conformance layer, or binder layer of a retroreflective sheeting) in the form of a thin film. Preferably, the support comprises a moving web of retroreflective sheeting. The thin adhesive film may be formed by pumping the adhesive through a coating die, optionally with the aid of a gear pump or other suitable device to develop sufficient pressure. The die is preferably of the contacting variety (i.e. not a drop die) which smears the adhesive onto a moving web supported on a backup roll. The die may have a flexible blade, a cylindrical rubber wipe, or a rotating cylindrical metal rod on the downstream side of the die opening to spread the adhesive. The die may be located at the output of the compounding device to allow coating in-line with the compounding and extruding operations. Alternatively, the adhesive may be discharged from the compounding device and fed to the coating die using a separate extruder, melt pump, or combination of extruder and melt pump with sufficient pressure to force the adhesive mixture through the die. The adhesive may optionally be filtered prior to feeding to the coating die.

The coated adhesive may optionally be crosslinked by exposure to ionizing radiation, such as electron beam or ultraviolet radiation, or a phenolic resin may be added as a chemical crosslinker, to enhance the cohesive strength of the material. Crosslinking may be carried out in-line with the coating operation or may occur as a separate process. The degree of crosslinking should not result in the rubber being insoluble in toluene.

A release coating may also be optionally be applied to the web, either before or after application of the adhesive. The release coating may be continuous or discontinuous on the web and is normally on the surface of the web opposite that which ultimately bears the adhesive. The release coating may be applied either in-line with the coating or crosslinking operations, or as a separate process.

A twin screw extruder is preferably used as the compounding device. The extruder screw should be configured to masticate the elastomer in the first processing zone prior to addition of the tackifier. Additionally, if a blend of elastomers is used in the adhesive, the first processing zone preferably allows mastication and blending of the elastomer components. The portion of the extruder and screw following the first processing zone must be designed to permit the addition of the tackifier and other additives to the elastomer and good mixing of the elastomer with these materials. Preferably, the screw is designed so that a homogeneous adhesive composition results.

The design of the screw to achieve mastication, conveying and blending follows normal practices known in the art. Namely, the screw has a sequence of conveying and processing zones. Flow restriction and mixing elements are provided so as to achieve appropriate flow along the screw and obtain appropriate mastication and mixing. The conveying zones may contain ordinary Archimedes screw elements. The processing zones may contain kneading blocks, pin mixers, or other elements designed for mastication, compounding and mixing. Flow restriction elements, such as kneading blocks arranged with a reverse pitch, reverse pitched conveying screws, a disk element or other device designed to restrict the flow of material, may also be present in the processing zone to ensure that the portion of the processing zone preceding these elements tends to run full of material while the conveying zone following them tends to run only partially full.

A wide variety of amorphous hydrocarbon elastomers can be employed in the present invention. These materials may be used singly or blended together in the practice of the invention. Examples of these elastomers include, natural rubber, butyl rubber, synthetic polyisoprene, ethylene-propylene rubber, ethylene-propylenediene monomer rubber (EPDM), polybutadiene, polyisobutylene, poly(alpha-olefin) and styrene-butadiene random copolymer rubber. These elastomers are distinguished from thermoplastic elastomers of the block copolymer type such as styrenic-diene block copolymers which have glassy end blocks joined to an intermediate rubbery block.

Adhesives useful in the present invention preferably contain a "nonphenolic" tackifier wherein "non-phenolic" means the tackifier is selected from rosins, terpenes, and hydrocarbon resin type tackifier. Certain terpene-type tackifiers actually may have a minor portion of phenolic comonomer.

Non-phenolic tackifiers are useful since they make it easy to control the elastic modulus and tack of the adhesive to the desired ranges.

Suitable non-phenolic tackifiers include one or more abietic acid types such as abietic acid, neoabietic acid, palustric acid, dihydroabietic acid, tetrahydroabietic acid, and dehydroabietic acid, esters of all of these; and pimaric acid types, such as pimaric acid and isopimaric acid, dehydrated versions thereof, and esters thereof. Esters of abietic acid types and pimaric acid types are typically and preferably made by reacting the acid with a polyol, such as pentaerythritol, glycerin, ethylene glycol, and the like. Representative commercial examples include those known under the trade designations ESTER GUM 8D (a rosin ester), HERCOFLEX 400 (a rosin ester), HERCOLYN D (a hydrogenated methyl ester), FORAL 85 (a hydrogenated glycerin rosin ester), ESTER R-95 (a pentaerythritol rosin ester), and FORAL 105 (a hydrogenated pentaerythritol rosin ester), all available from Hercules Chemical Co.

Suitable terpene-type non-phenolic tackifiers include polymerized versions monomers such as α-pinene, β-pinene, and dipentene (limonene), and the like, with optional modification with C9 monomers such as styrene monomer. Typical molecular weights of these tackifiers ranges from about 300 to about 2000. The monomers are typically derived from turpentine and other natural sources, such as citrus peels, although synthetic versions are equally operative. Commercially available terpene-type non-phenolic tackifiers include those known under the trade designations ZONAREZ A-25 (α-pinene based, Tg=–22° C.), ZONAREZ A-100 (α-pinene based, Tg=55° C.), both available from Arizona Chemicals; PICCOLYTE S10 (β-pinene based, Tg=–37° C.), PICCOLYTE S115 (β-pinene based, Tg=64° C.), PICCOLYTE A115 (α-pinene based, Tg=64° C.), PICCOFYN A-135 (phenolic polyterpene, Tg=84° ), and PICCOLYTE HM-85 (styrenated terpene, Tg=35° C.), all available from Hercules Chemical.

Suitable hydrocarbon-type non-phenolic tackifiers are low molecular weight polymers derived from either aliphatic or aromatic hydrocarbon monomers using a Lewis acid catalyst (cationic polymerization) or heat and pressure (free radicalinitiated addition polymerization).

Examples of suitable aliphatic resins include those derived from cispiperylene, trans-piperylene, isoprene, 2-methylbutene-2, dicyclopentadiene, and the like, having molecular weights preferably ranging from about 800 to about 1500. Commercially available versions include those known under the trade designations WINGTACK 10 (Tg=–28° C.) and WINGTACK 95 (Tg=50° C.), both available from Goodyear Chemical Co.; ESCOREZ 1310 (Tg=40° C.) and ESCOREZ 5300 (Tg=50° C.), both from Exxon Chemical Co.; and PICCOTAC 95 (Tg=41 ° C.), available from Hercules Chemical Co.

Examples of suitable aromatic resins include those derived from indene, styrene, methylindene(s), methylstyrene(s), and the like, preferably having molecular weight ranging from about 300 to about 1200. The aromatic resins may be hydrogenated to give better stability and/or compatibility. Commercially available versions include those known under the trade designations PICCOVAR AP-25 (C9 type, Tg=–50° C.) and REGALREZ 1094 (hydrogenated α-methyl styrene, Tg=37° C.), both available from Hercules Chemical Co.; ARKON P90(hydrogenated C9 type, Tg=36° C.), available from Arakawa Co.; and ESCOREZ 7105 (hydrogenated C9 type, Tg=52° C.), available from Exxon Chemical Co.

Terpene-type tackifiers are optimal because they exhibit high compatibility with the rubber component and impart high adhesion, and control of tack is more easily accomplished.

Tackifiers useful in the invention preferably have a low molecular weight relative to the hydrocarbon elastomer, a $T_g$ higher than that of the hydrocarbon elastomer, and are preferably totally miscible with the rubber component.

Typically the tackifier comprises from about 60 to about 125 parts by weight per 100 parts by weight of the rubber. A particularly preferred tackifier is β-pinene, available from Hercules Chemical Co., Inc., under the trade designation PICCOLYTE S-115.

A number of adjuvants may also be used in the adhesive. Examples of such adjuvants include antioxidants, such as hindered phenols, hindered amines, and sulphur and phosphorous hydroperoxide decomposers; inorganic fillers such as talc, zinc oxide, titanium dioxide, aluminum oxide, and silica; plasticizing aids such as those materials described as plasticizers in the *Dictionary of Rubber*, K. F. Heinisch, pp. 359, John Wiley & Sons, New York (1974), oils, elastomer oligomers and waxes; and the like. Typically, any antioxidant present comprises up to 5 parts by weight per 100 parts by weight elastomer; the inorganic filler may comprise up to 50 parts by weight per 100 parts by weight of elastomer; and the plasticizing aids up to 10 percent by weight of the total adhesive. Preferably, the use of plasticizing aids is unnecessary.

II. Retroreflective Sheetings For SOLAS

A. Articles incorporating Cube-corner Retroreflective Sheeting

One preferred embodiment of the articles of the present invention relates to a retroreflective article comprising a transparent retroreflective sheeting having a substantially flat first surface and a structured second surface, the structured second surface comprised of a plurality of grooves defining a plurality of peaks (in cube-corner sheeting at least two grooves intersect, whereas in prism films the grooves are parallel), a sealing film layer (colored or colorless) disposed in and bonded to a first portion of the grooves, a second portion of the grooves precluded from contact with the sealing film layer, and a pressure-sensitive adhesive layer (as herein described) disposed between the sealing film layer and a substrate, such as a highly monomerically plasticized PVC component.

As used herein the term "peak" means a projection having at least two planar facets, such as prisms, pyramidal protrusions, cube-corner protrusions, and the like. The phrase does not include protrusions which do not include planar facets, such as protrusions present in holographic films.

Figure 1:
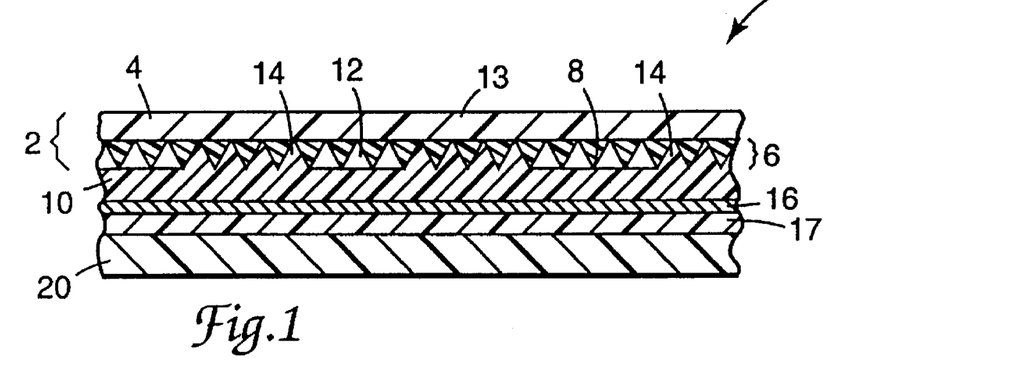
FIGS. 1–6 are cross-sectional views (enlarged) of illustrative retroreflective articles of the invention comprising an adhesive as described herein.

The term "transparent retroreflective sheeting" means a plastic sheeting transmitting at least 50% of incident light in the visible spectrum (about 400–700 nanometers wave length), as determined by a standard spectrophotometer. Referring now to FIGS. 1–6, wherein like numerals are used to denote like elements from figure to figure, a preferred embodiment of a cube-corner transparent retroreflective article of the invention is illustrated in cross-section (enlarged) in FIG. 1. In FIG. 1, sheeting 100 comprises a transparent layer 50 having a flat, smooth surface 54 and a structured surface 56 comprised of a plurality of peaks 58. Layer 50 may be extremely thin to enhance flexibility, or overlay 64 may have a low modulus as disclosed in assignee's copending patent application serial number 08/326,696, filed Oct. 20, 1994, incorporated by reference herein. In the '696 application, layer 50 is formed from a thermoplastic overlay film 64 and decoupled thermoset cube corner elements.

A thermoplastic sealing film layer 60 is disposed on peaks 58, and a plurality of air spaces 62 are defined between cube-comers and sealing film layer 60 so as to impart retroreflectivity to the article. Sealing film layer 60 is adhered to layer 50 at a plurality of sealing areas 66, where the thermoplastic sealing film material has flowed between individual cube corner elements to reach and fuse with the thermoplastic overlay film 64. The sealing prevents water, oil and the like from entering between sealing film layer 60 and layer 50.

In FIG. 1, reference numeral 68 denotes an optional chemical primer layer or a corona treatment layer positioned between sealing film layer 60 and a PSA layer 70. Chemical and/or physical priming is preferred but not necessary to the invention. The combination of layers consisting of layer 50, sealing film layer 60, and primer layer or corona treatment layer 68 is designated as a retroreflective sheeting substrate. A liner (not illustrated) is preferably positioned on the surface of PSA layer 70 so as to protect its surface prior to adhering to a fabric, such as a highly monomerically plasticized PVC component 72.

Figure 2:
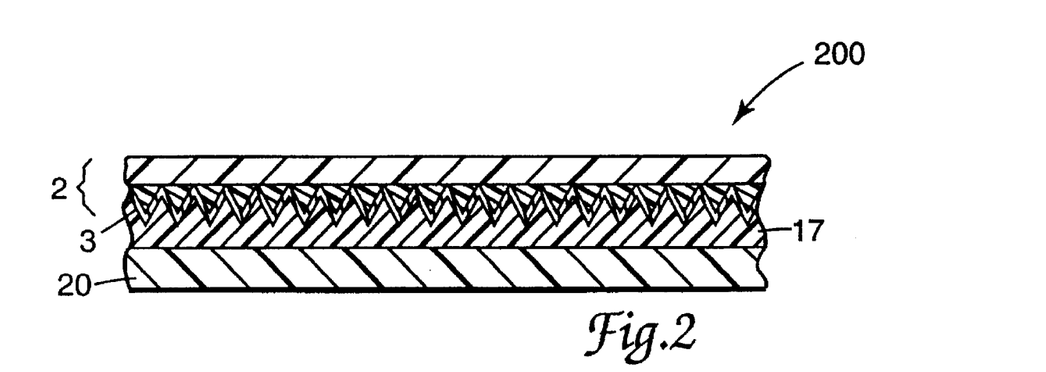

FIG. 2 illustrates another inventive article embodiment, respectively. FIG. 2 illustrates a cube-comer retroreflective sheeting 200, comprising layer 50 as in the embodiment illustrated in FIG. 1. However, embodiment 200 comprises a metal layer 51, which serves to reflect light incident upon layer 50. No sealing layer is present. FIG. 2 illustrates a layer of PSA 70 adhering a substrate, such as a plasticized PVC component 70 to metal layer 51. This embodiment eliminates the need for a sealing film, but requires the non-thermosettable PSA to be able to bond a plasticized PVC component to a metal surface.

Layer 50 may be any one of the cube-comer or substantially totally internal reflecting sheetings described in U.S. Pat. Nos. 3,140,340; 3,648,348; 4,576,850; 4,588,258; 4,775,219; 4,801,193; 4,805,984; 4,895,428; 4,906,070; 4,938,563; 5,056,892; 5,138,488; 5,175,030; and 5,183,597, all of which are incorporated herein by reference.

More concretely, layer 50 preferably comprises a large number of precisely shaped elements (preferably pyramidal, cube-comers or a series of parallel prisms) defined by grooves which define the elements. The pyramids, cube-comers, or prisms substantially totally reflect the light in a direction opposite to the incident direction. The precisely shaped elements define a plurality of pockets 11 (FIGS. 1 and 2), filled with air or other fluid. "Substantially totally internal reflecting" pertains to the optical quality of the film, and means that the film has a T-Test Value of 5% or less, wherein the T-Test is described as follows. The optical quality of a retroreflective film can be evaluated with apparatus including a laser (such as a Spectra-Physics Inc. Model 117A) with a spatial filter, a beam expander, and a collimator. Two diaphragms or irises are placed 18 and 38 cm from the laser, and an annular sample holder with an opening 6.35 cm in diameter is placed 84 cm from the laser. Directly behind the sample holder is an integrating sphere (with a 3 cm diameter aperture) and a LABSPHERE ML-400 radiometer. Using the diaphragms or irises, the laser is focused through the aperture to obtain a clean circle of light of about 3 mm diameter on a black surface mounted on the sample holder. A source intensity measurement of 100% is taken with no sample in place. The TIRF to be tested is then mounted on the sample holder with its flat surface facing the laser and its grooves extending vertically. Unless otherwise reported, T-Test Values are measured at ambient temperature. Readings are then made at from 12 to 15 different points on the TIRF within a 5 cm diameter area while making sure that none of the light strikes the frame of the sample holder. The readings are averaged and multiplied by 100 to give percent transmission which is the T-Test Value of the TIRF sample. T-Test Value is a criterion of the fidelity of replication of the TIRF. Smaller T-Test Value percentages indicate better fidelity of replication than larger percentages, and a T-Test Value of 5% or less indicates that the film is substantially totally internal reflecting.

Layer 50 preferably comprises an acrylic material having excellent durability, such as poly(methyl)methacrylate, polyester (such as polyethylene terephthalate), polyamide, polycarbonate, poly(vinylchloride), poly (vinylidenechloride), cellulose acetate butyrate, cellulose acetate propionate, poly(ethersulfone), polyurethane, ionomer resins (such as the metal ion crosslinked polyethylene/acrylic acid ionomers known under the trade designation SURLYN), and the like, and preferably also comprises a UV absorber.

From the aspects of mechanical strength and light reflectivity, layer 50 preferably has a refractive index of about 1.6, which is possible if the layer is made of a polycarbonate resin, an ionomer resin such as just described, or an acrylic resin.

Structured sheeting or layer 50 may be made as one integral material, e.g., by embossing a preformed sheet with a described array of cube-corner elements, or casting a fluid material into a mold; or they may be made as a layered product, e.g., by casting the elements against a preformed film as taught in U.S. Pat. No. 3,684,348, or by laminating a preformed film over the front face of individual molded elements. Polycarbonates and ionomers are preferred integral sheet materials.

The thickness of layer 50 preferably ranges from about 50 to about 500 micrometers in terms of the height from the apex of the pyramid or prism to the base of the base portion. If the thickness is less than 50 micrometers, the mechanical strength is not sufficient and a predetermined height is difficult to obtain for the pyramids or prisms, so that retroreflectivity decreases. If the thickness exceeds 500 micrometers, on the other hand, the total thickness of the retroreflective sheet becomes so thick that handling becomes difficult and the amount of adhesive required increases.

In the present invention, sealing film layer 60 (FIG. 1) is involved in exhibition of retroreflectivity by forming an air layer 62 between sealing film layer 60 and layer 50. In other words, in order for layer 50 to exhibit retroreflectivity, an air layer must exist below the precisely shaped elements so as to produce a change in refractive index. Sealing film layer 60 is laminated onto the structured surface of layer 50, and sealing film layer 60 is bonded thereto with heat and/or radiation at a plurality of locations, thus forming a plurality of sealed air pockets. It is understood that "air" is used only as an example and that other fluids may be used, depending on the atmosphere in which the articles of the invention are produced, and provided that the fluid used is significantly different in refractive index from layer 50 (a difference in refractive indices of 0.5 is preferred). The procedures of U.S. Pat. No. 4,025,159 (incorporated by reference herein) may be used to effect the bonding of sealing film layer 60 to the structured second surface of layer 50.

If water, oil or the like enters between layer 50 and sealing film layer 60, the refractive index changes and retroreflectivity is lowered. Accordingly, the sealing film layer has the seal effect for water and the like.

Sealing film layer 60 is preferably a plastic film-like article comprising a plastic resin, such as polyurethane, polyester, polyvinylchloride and the like, which may contain a predetermined amount of one or more pigments such as titanium dioxide (white), silica, red oxide, and the like, added to the resin. Particularly, white is suitable for the present invention because recognizability of the retroreflective articles of the invention is high.

B. Articles Employing Beaded Retroreflective Sheeting

Figure 3:
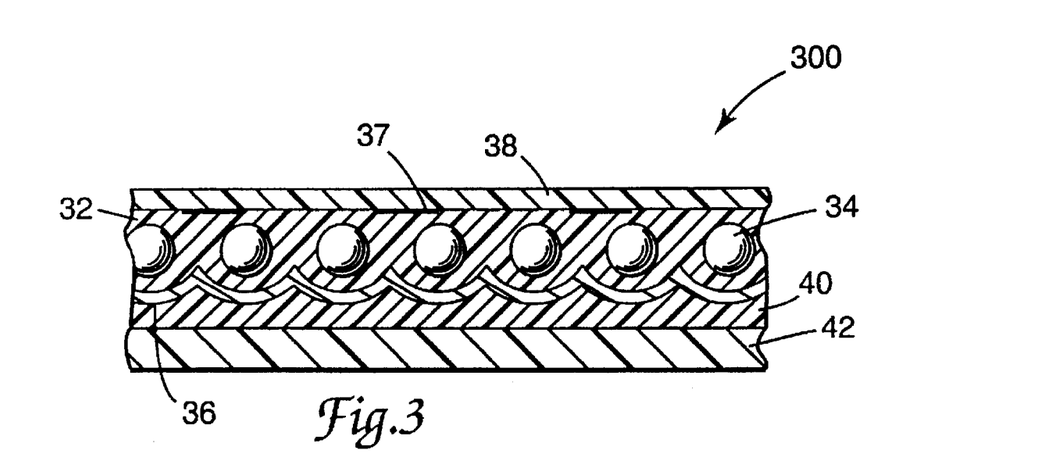

FIG. 3 is a cross-sectional view (enlarged) of an illustrative article embodiment 300 of the invention comprising an embedded lens retroreflective sheeting adhered to a substrate using an adhesive in accordance with the invention. In this embodiment, the retroreflective sheeting comprises a polyvinyl butyral layer 80 in which a plurality of glass microspheres 82 are embedded. Other organic layers, such as glyptal, alkyd, ethylene and/or propylene acrylic acid copolymers, ethylene methacrylic acid copolymer, ionomers, crosslinked and/or uncrosslinked aliphatic polyurethanes, vinyl, PMMA, and the like may also comprise layer 80. A cover material 86 is illustrated over printed indicia for abrasion resistance, chemical deterioration resistance, and the like, which would be desired by users of the inventive articles in prolonged (i.e. greater than 1 year) outdoor usage, such as life rafts, life vests, and the like. A reflective layer 84, PSA layer 90, and substrate (for example a plasticized PVC component 92) complete the structure.

Preferred embedded lens retroreflective sheetings include those known under the trade designation SCOTCHLITE, available from Minnesota Mining and Manufacturing Co., St. Paul, Minn., hereinafter 3 M). Enclosed-lens retroreflective sheetings may also be used and are described in U.S. Pat. Nos. 2,407,680, 4,664,966 and 4,511,210, all incorporated herein by reference.

Figure 4:
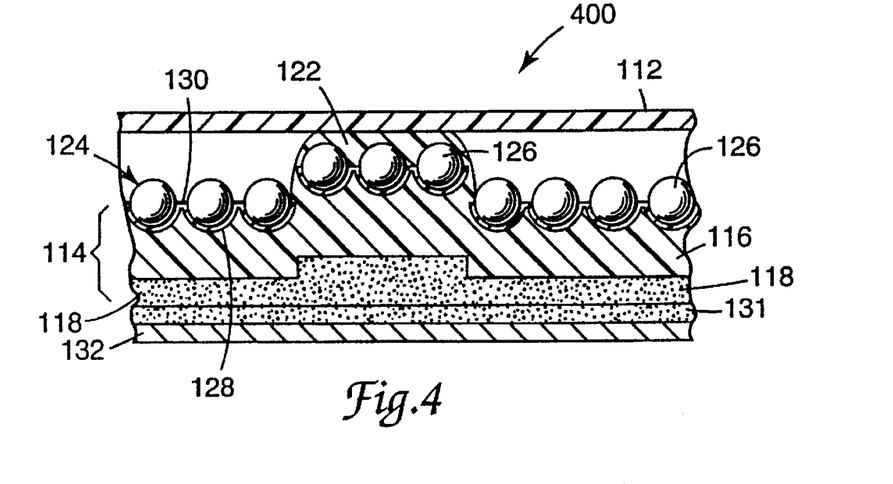
Figure 5:
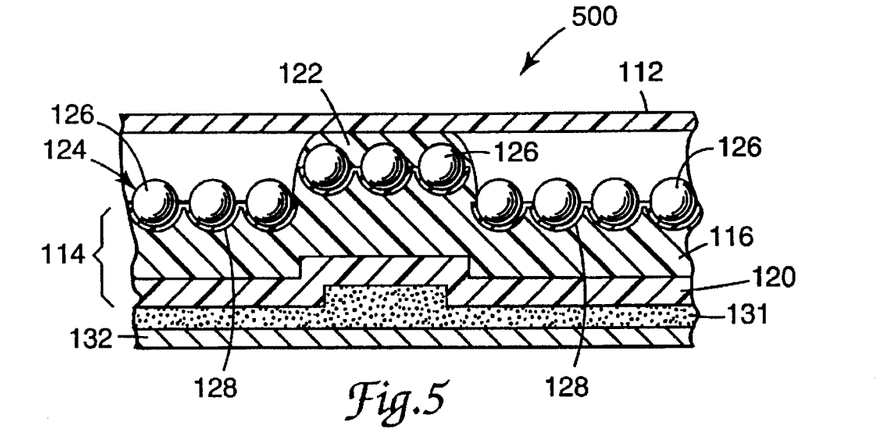

Also useful retroreflective sheetings are encapsulated-lens sheetings disclosed in U.S. Pat. Nos. 3,190,178; 4,025,159; 4,896,943; 5,064,272; 5,066,098, and 5,069,964, all incorporated herein by reference. FIGS. 4 and 5 are illustrative cross-sections (enlarged) of two useful retroreflective encapsulated lens sheetings 400 and 500, respectively as described in detail and illustrated as FIGS. 1 and 2 in U.S. Pat. No. 5,069,964.

FIG. 4 is a cross-sectional illustration of a completed portion 400 of one microsphere-based embodiment of retroreflective sheeting of the invention. Sheeting 400 comprises in part face member 112, (sometimes referred to as a cover film or cover sheet), and encapsulating member 114 which comprises binder layer 116, intermediate adhesive 118. The pressure sensitive adhesive or mounting adhesive layer 120 is in direct contact on one face with the intermediate adhesive 118. Face member 112 and encapsulating member 114 are disposed in spaced relation and sealed by a network of intersecting bonds 122. Sheeting 400 also comprises retroreflective elements 124 disposed between face member 112 and encapsulating member 114. Retroreflective elements 124 are arranged in substantially a monolayer and have an air-interface, i.e., the front surfaces thereof are exposed. In this embodiment, retroreflective elements 124 are partially embedded in binder layer 116 of encapsulating member 114 and partially protrude from surface 130 thereof, and comprise microspheres 126 having reflectors 128 disposed behind the rear surfaces thereof. Typically, the mounting adhesive 120 will be covered by removable protective liner 132 during handling.

FIG. 5 is a cross-sectional illustration of a completed portion 500 of another microsphere-based embodiment of retroreflective sheeting of the invention wherein barrier layer 120 is adhered directly to the back side of binder layer 116 of encapsulating member 114, i.e., is "self-adhered" thereto without use of an intermediate adhesive. As illustrated in FIG. 5, retroreflective sheetings of the invention comprise mounting adhesive 131 on the back side of encapsulating member 114 to be used to affix sheeting 500 to a substrate (not shown). Typically mounting adhesive 131 will be covered by removable protective liner 132 during handling.

Figure 6:
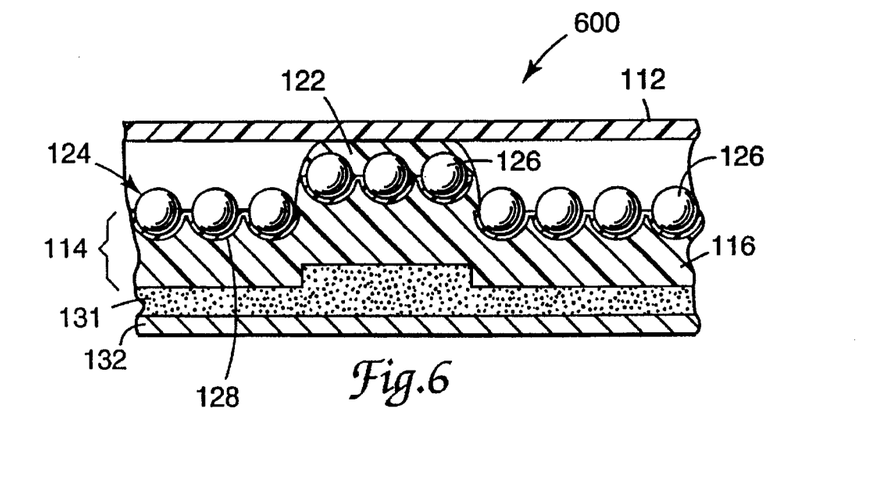

FIG. 6 is a cross-sectional illustration of a completed portion 600 of still another microsphere-based embodiment of retroreflective sheeting of the invention wherein mounting adhesive 131 is adhered directly to the back side of binder layer 116 of encapsulating member 114, i.e., is "directly adhered"thereto without use of a barrier layer, to be used to affix sheeting 600 to a substrate (not shown). Mounting adhesive 131 will also be covered by removable protective line 132 during handling.

Embodiments 400, 500 and 600 of FIGS. 4, 5 and 6, respectively, are particularly useful as mentioned for SOLAS applications. In particular, the United States Coast Guard specifies that life vest substrates are preferably one of the following materials: rubber coated cloth, vinyl film, vinyl laminated to nylon cloth, cotton coat "drill" with pigment, or fiber glass. In addition, highly monomeric plasticized PVC and polyolefin film and coated fabric may also be useful.

This invention is illustrated by the following examples, but the particular materials and amounts thereof recited in these examples, as well as other conditions and details should not be construed to unduly limit the claims.

EXAMPLES

Example A

The natural rubber resin PSA was made using the process described above. The following adhesive formulation was anaerobically compounded and coated out onto differential release liner. A controlled Mooney viscosity natural rubber (SMR CV60) (available from The Ore and Chemical Company, Inc.) was ground and dusted with talc. This rubber was fed to Zone 1 of a co-rotating twin screw extruder (ZSK-90 Werner-Pfeiderer Co.) at the rate of 99.5 lbs/hr (45.2 kg/hr). Piccolyte™ S-115, β-pinene, tackifier was added with the rubber stream into Zone 1 at the rate of 14.9 lbs/hr (6.8 kg/hr). The extruder screw was operated at 150 rpm. Temperatures in Zones 1–3 were set to approximately 90° C. Tackifier was added to zone 4 at the rate of 24.9 lbs/hr (11.3 kg/hr). Additional tackifier was added at Zone 5 at the rate of 59.7 lbs/hr (27.1 kg/hr). Temperature in Zones 4 and 5 was set to 66° C. Antioxidant was added to the Zone 5 tackifier stream at the rate of 1.0 lbs/hr (.45 kg/hr). The adhesive was applied at a rate of 200 lbs/hr (90.8 kg/hr) and coated to a width of 14 inches (35.6 cm). The line speed was automatically adjusted to maintain a coating thickness of 7 mils (177 μm). The adhesive was exposed in line to 2 Mrad of electron beam radiation at 192 kV accelerating voltage.

Example 1

A polyethylene-coated paper carrier was heated to about 105° C. and then flooded with glass microspheres having an average diameter of about 65 microns and a refractive index of about 1.91. The excess microspheres were removed from the surface of the carrier yielding substantially a monolayer of microspheres thereon, and the carrier and monolayer then heated about 140° C. to soften the polyethylene coating such that the microspheres were partially embedded therein by gravity and capillary forces in accordance with standard techniques. The carrier and monolayer were then put into a vacuum chamber and a layer of aluminum deposited thereon to a thickness of 100 manometers.

A solvent-borne urethane/vinyl system binder material comprising 18.0 parts aromatic urethanes, 6.0 parts vinyl, 8.30 parts titanium dioxide, 0.5 part Irganox 1010 (heat stabilizer from Ciba-Geigy), 0.5 part UVINOLN35 (vinyl stabilizer from BASF), 0.5 part stearic acid, and 66.5 parts solvents was coated on the aluminum coated microspheres and the assembly dried in an oven at 250° F. to remove the solvents, forming the binder layer.

An acrylate PSA transfer film was then hot laminated to the exposed surface of the binder, such that the surface of the PSA was in contact with the binder material. This PSA transfer film comprises of an acrylate PSA layer having a thickness of about 1.5 mils and a polyethylene-coated polyester film having an overall thickness of about 1.0 mil. This PSA layer was formed by bar coating a solvent solution of acrylate pressure sensitive base 90:10 copolymer of 2-methyl butyl acrylate:acrylate acid onto a polyethylene coated polyester carrier and drying by heat in an oven to remove most of the solvents.

The polyethylene coated paper carrier was then stripped off to expose the front surface of the microspheres embedded in the binder material, thus leaving the base sheet.

The cover sheet made in exactly the same manner as described in U.S. Pat. No. 5,069,964, Example 1, was then contacted to the base sheet such that the inner layer was in contact with the microspheres protruding from the base sheet and sealed thereto along a network of interconnecting bonds in accordance with standard procedures. After the interconnecting bonds were formed, the polyethylene-coated polyester carrier was then removed from the base sheet, i.e., it was used only as a sealing film, thus leaving an intermediate acrylate PSA adhered to the binder material.

The solventless natural rubber resin PSA coated on liner of Example A, was then applied directly to the exposed surface of the intermediate acrylate PSA layer that adheres to the binder, and the liner was removed. This PSA layer is called a substrate or mounting PSA layer because it adheres the retroreflective sheeting to the substrates after the liner is removed.

Finally the carrier was removed from the front surface of the cover film.

Example 2

Retroreflective sheeting was manufactured using the same materials and conditions as described in U.S. Pat. No. 5,069,964, Example 1, except using the solventless natural rubber resin PSA of Example A as the substrate PSA. In this example, the substrate PSA was applied directly to the exposed sealing film that adhered to the binder material.

Example 3

Retroreflective sheeting was made in exactly the same manner as the Comparative Example A in U.S. Pat. No. 5,069,964, except using the solventless natural rubber resin PSA of Example A as the substrate PSA. In this example, the substrate PSA is applied directly to the exposed binder layer.

Comparative Example 1

Example 1 was repeated except using as substrate PSA layer ROBOND PS67, latex acrylic PSA (available from Rohm & Haas) layer formed on a liner having an adhesive thickness of 5 mils. This substrate PSA layer was formed by bar coating the PSA solution (that contains 35% solid by weight) on a release liner at the gap setting of 14 mils and dried by heating for 5 minutes in an oven at 200° F. following 5 minutes of air drying in order to remove most of the solvents.

Comparative Example 2

Example 1 was repeated except using as substrate PSA AROSET 1081-Z-45, thermoplastic acrylic PSA (available from Asland Chemical, Inc.) layer formed on a liner, having an adhesive thickness of 5 mils. This substrate PSA layer was prepared in exactly the same manner described in the Comparative Example 1, except the gap setting was adjusted to obtain 5 mils thick of PSA layer on liner after drying because the PSA solution has a different percent solid.

Comparative Example 3

Example 1 was repeated using as substrate PSA AROSET 1085-Z-45, heat activated crosslinking acrylic PSA (available from Asland Chemical, Inc.) layer formed on a liner having a thickness of 5 mils. This substrate PSA layer was prepared in exactly the same manner described in the Comparative Example 1, except that the gap setting was adjusted to obtain 5 mils thick of PSA layer on liner after drying because the PSA solution has a different percent solid.

Comparative Example 4

Example 1 was repeated using as substrate PSA the UP 309, acrylic PSA transfer tape (adhesive coated on a differential release liner which is available from Coating Science Inc.).

Comparative Example 5

Example 1 was repeated except using as substrate PSA the 8768 A, Latex rubber-based adhesive (available from Bostik) layer formed on liner having an adhesive thickness of 7 mils. This substrate PSA was prepared in exactly the same manner described in the Comparative Example 1, except that the gap setting was adjusted to obtain 7 mils thick of PSA layer on liner after drying because the PSA solution has a different percent solid.

Comparative Example 6

Example 1 was repeated, except using a PSA substrate the 6 mils thick acrylate PSA containing 90 parts by weights of iso-octyl acrylate and 10 parts by weight of acrylic acid. This substrate PSA was prepared in exactly the same manner described in the Comparative Example 1, except that the gap setting was adjusted to obtain 6 mils thick of PSA layer on liner after drying because the PSA solution has a different percent solid.

Comparative Example 7

Commercially available, Scotchlite SOLAS Grade 3150I, encapsulated-lens sheeting. This sheeting was manufactured in the same manner described in Example 1, except using the substrate PSA of Comparative Example 6 and having an adhesive thickness of 3 mils.

Comparative Example 8

Commercially available SOLAS retroreflective sheeting sold by REFLEXITE under designation REFLEXITE SOLAS/UK—D.O.T. employing the substrate adhesive having the same composition as the substrate adhesive of Comparative Example 4.

Adhesion Strength

The PSA-backed retroreflective sheets of Examples 1–3 and Comparative Examples 1–8 were tested without the aid of a primer, in accordance with the USCG (United States Coast Guard) adhesion test method listed in the subpart 164.018"Retroreflective materials for lifesaving equipment"of 46 CFR Ch. I (10-1-93 Edition), that described in Federal Specification L-S-300.

In this test, a rigid backing is used, to which the test substrate is adhered with a contact adhesive, except that once the test substrate was bonded to the rigid backing, the assembly is cut into a 50 mm×90 mm substrate panel. The PSA-coated retroreflective sheeting with a size of 25 mm×100 mm would be then applied to the substrate panel (with one end hanging loose and not adhered to the test substrate) where the PSA in contacted with test surface of the substrate panel. This assembly is called as the test panel.

When the PSA-backed retroreflective material is tested in accordance with this adhesion test, the material must be tested using a 0.75 Kg (1.75 lb) test weight and using each of the materials including aluminum (listed on Table A) as test substrates, and the material must not peel for a distance of more than 5 cm (2 in.) in 5 minutes.

TABLE A

| | |
|---|---|
| (A) | Aluminum panel |
| (B) | Vinyl film meeting L-P-375 |
| (C) | Cured polyester laminating resin meeting MIL-R-21607 |
| (D) | Vinyl-nylon lamimted cloth meeting MIL-C-43006 |
| (E) | Cotton drill meeting CCC-C-443 |
| (F) | Rubber coated cloth meeting MIL-C-17415 |

For each test substrate, identical test panels were prepared, and one was immersed in distilled water in a cover container for 16 hours before the 0.75 Kg (1.75 lb) test weight was attached to the loose end of the PSA-backed retroreflective sheeting (where the test panel was placed in a holder so that the test weight was hanging vertically down from the test panel), and the other test panel was immersed into a salt water (4%NaCl by weight) in a cover container for 16 hours before the test weight was applied. If a particular test panel used in testing results in a test failure, the retroreflective material will not be approved by the U.S. Coast Guard for attachment to the substrate of the type used in the test panel. The PSA-backed retroreflective material may nevertheless be approved for use with other types of substrates depending on the results testing with other panels.

Testing of the sheetings of Examples 1–3 and Comparative Examples 1–8 for adhesive strength without the need of primer, in accordance with this USCG adhesion test method against the substrates that listed on Table A, yielded the results shown in Table 1.

In addition, the PSA-backed retroreflective sheets of Examples 1–3 and Comparative Examples 1–8 were tested without the aid of primer for adhesive strength in accordance with the IMO (Intention Maritime Organization) adhesion test method listed in section 4.6 of the Technical Specification for Retroreflective Material for Use on Life-Saving Appliances, against the test surface materials that listed in Table B.

TABLE B

| Identification | Substrate |
|---|---|
| DK.1 | Denmark/Viking Life raft Canopy |
| DK.2 | Denmark/Viking Life raft |
| I.1 | Germany/Paul Merten/IMO - Life Jacket |
| IV.1 | Germany/DSB/IMO - Life raft Bottom |
| IV.2 | Germany/DSB/IMO - Life raft Top |
| V.1 | Germany/Kadematic/CEN - Life jacket |
| UK.1 | United Kingdom - Beaufort Survival Suit |
| UK.2 | United Kingdom - Beaufort Life Jacket |
| UK.4 | United Kingdom - Beaufort Life Raft |
| UK.5 | United Kingdom - Crew Saver Life Jacket |
| AL | Aluminum |
| GRP | Cured polyester |

In this test, the test panels were prepared and tested in exactly the same conditions described in USCG adhesion test method, except that the adhesion strength of the PSA-backed retroreflective sheeting was measured by a "Peel tester" manufactured by Instron Co., at a 180 degree pull back with a speed of 300 mm/min.

The retroreflective sheet is designed for use with an adhesive tested in accordance with this test, should have an average adhesion strength no less than 16 Newton per 25 mm width. If the particular test panel used in testing results in a test failure, the retroreflective material will not be approved for attachment to material of the type used as the test panel.

Testing results of retroreflective sheetings of Examples 1–3 and Comparative Examples 1–8 without the aid of primer for adhesive strength against the life-saving materials (listed in Table B), in accordance with this IMO adhesion test method are shown in table 2.

TABLE 1

(USCG Adhesion strength against test substrates listed in Table A)*
ADHESION STRENGTH PER USCG - 90 DEG. HANGING WEIGHT,
PEEL DISTANCE, INCHES (CM) IN 5 MIN.

| SUBSTRATE | A | B | C | D | F | G |
|---|---|---|---|---|---|---|
| | | | DISTILLED WATER | | | |
| Example 1 | 0.20 (0.51) | 0.20 (0.18) | 0.20 (0.51) | 0.21 (0.53) | 0.50 (1.27) | >2.0 (5.0) |
| Example 2 | 0.40 (1.02) | 0.40 (1.02) | 0.45 (1.14) | 0.40 (1.02) | 1.25 (3.18) | >2.0 (5.0) |
| Example 3 | 0.30 (0.76) | 0.20 (0.51) | 0.20 (0.51) | 0.75 (1.91) | 1.10 (2.79) | >2.0 (5.0) |
| Comparative Example 1 | >2.0 (5.0) | 1.50 (3.81) | 0.55 (1.40) | >2.0 (5.0) | >2.0 (5.0) | >2.0 (5.0) |
| Comparative Example 2 | 0.50 (1.27) | 0.85 (2.16) | 0.25 (0.64) | 0.35 (0.89) | 1.30 (3.30) | >2.0 (5.0) |
| Comparative Example 3 | 0.60 (1.52) | 0.45 (1.14) | 0.40 (1.02) | 0.55 (1.40) | 1.50 (3.81) | >2.0 (5.0) |

TABLE 1-continued (USCG Adhesion strength against test substrates listed in Table A)*
ADHESION STRENGTH PER USCG - 90 DEG. HANGING WEIGHT,
PEEL DISTANCE, INCHES (CM) IN 5 MIN.

| SUBSTRATE | A | B | C | D | F | G |
|---|---|---|---|---|---|---|
| Comparative Example 4 | 1.50 (3.81) | 0.20 (0.51) | 0.40 (1.02) | 0.50 (1.27) | >2.0 (5.0) | >2.0 (5.0) |
| Comparative Example 5 | >2.0 (5.0) | >2.0 (5.0) | >2.0 (5.0) | >2.0 (5.0) | >2.0 (5.0) | >2.0 (5.0) |
| Comparative Example 6 | 0.15 (0.38) | 0.25 (0.64) | >2.0 (5.0) | >2.0 (5.0) | >2.0 (5.0) | >2.0 (5.0) |
| Comparative Example 7 | 0.25 (0.64) | 0.45 (1.14) | >2.0 (5.0) | >2.0 (5.0) | >2.0 (5.0) | >2.0 (5.0) |
| Comparative Example 8 | 0.40 (1.02) | 0.40 (1.02) | 0.35 (0.89) | 0.40 (1.02) | >2.0 (5.0) | >2.0 (5.0) |
| 4% SALT WATER | | | | | | |
| Example 1 | 0.10 (0.24) | 0.20 (0.18) | 0.13 (0.33) | 0.13 (0.33) | 0.20 (0.18) | >2.0 (5.0) |
| Example 2 | 0.20 (0.51) | 0.20 (0.51) | 0.35 (0.89) | 0.25 (0.64) | 1.10 (2.79) | >2.0 (5.0) |
| Example 3 | 0.20 (0.51) | 0.20 (0.51) | 0.15 (0.38) | 0.51 (1.30) | 0.80 (2.03) | >2.0 (5.0) |
| Comparative Example 1 | 1.90 (4.83) | 1.25 (3.18) | 0.25 (0.64) | >2.0 (5.0) | >2.0 (5.0) | >2.0 (5.0) |
| Comparative Example 2 | 0.20 (0.51) | 0.20 (0.51) | 0.25 (0.64) | 0.25 (0.64) | 1.10 (2.79) | >2.0 (5.0) |
| Comparative Example 3 | 0.50 (1.27) | 0.35 (0.89) | 0.25 (0.64) | 0.35 (0.89) | >2.0 (5.0) | >2.0 (5.0) |
| Comparative Example 4 | 1.20 (3.05) | 0.20 (0.51) | 0.25 (0.64) | 0.30 (0.76) | >2.0 (5.0) | >2.0 (5.0) |
| Comparative Example 5 | >2.0 (5.0) | >2.0 (5.0) | >2.0 (5.0) | >2.0 (5.0) | >2.0 (5.0) | >2.0 (5.0) |
| Comparative Example 6 | 0.20 (0.51) | 0.10 (0.25) | 1.80 (4.57) | >2.0 (5.0) | >2.0 (5.0) | >2.0 (5.0) |
| Comparative Example 7 | 0.25 (0.64) | 0.33 (0.84) | >2.0 (5.0) | >2.0 (5.0) | >2.0 (5.0) | >2.0 (5.0) |
| Comparative Example 8 | 0.40 (1.02) | 0.40 (1.02) | 0.35 (0.89) | 0.40 (1.02) | >2.0 (5.0) | >2.0 (5.0) |

*Tested after 16 hrs immersion in water, within 5 min. remove from water. Number in ( ) indicates centimeters.

TABLE 2

(IMO Adhesion strength against test substrates listed in Table B)*
ADHESION STRENGTH PER IMO -180 DEG. PEEL PULL BACK, Newton per 25 mm width

| SUBSTRATE | AI | GRP | DK1 | DK2 | I.1 | IV.1 | IV.2 | V.1 | UK1 | UK2 | UK4 | UK5 |
|---|---|---|---|---|---|---|---|---|---|---|---|---|
| SALT WATER | | | | | | | | | | | | |
| Example 1 | 32.7 | 34.0 | 38.2 | 34.0 | 19.8 | 39.0 | 32.3 | 23.8 | 33.4 | 28.7 | 29.6 | 29.9 |
| Example 2 | 34.9 | 38.4 | 37.7 | 31.8 | 22.5 | 37.2 | 25.9 | 17.1 | 28.4 | 23.6 | 24.8 | 30.0 |
| Example 3 | 31.4 | 32.7 | 36.5 | 30.5 | 19.2 | 35.4 | 22.5 | 17.5 | 26.7 | 22.8 | 24.1 | 29.8 |
| Comparative Example 1 | 26.2 | 43.6 | 30.1 | <16.0 | <16.0 | 27.6 | <16.0 | <16.0 | <16.0 | <16.0 | 19.7 | <16.0 |
| Comparative Example 2 | 43.6 | 24.0 | 31.1 | 20.8 | <16.0 | 34.6 | <16.0 | <16.0 | 26.4 | 25.6 | 13.9 | 31.8 |
| Comparative Example 3 | 28.3 | 19.6 | 30.6 | <16.0 | <16.0 | 30.2 | <16.0 | <16.0 | 18.9 | 16.9 | <16 | 22.5 |
| Comparative Example 4 | 30.5 | 33.1 | 32.3 | <16.0 | <16.0 | 33.7 | <16.0 | 21.1 | 29.5 | 32.7 | 16.1 | 31.2 |
| Comparative Example 5 | 34.9 | <16.0 | <16.0 | <16.0 | <16.0 | <16.0 | <16.0 | <16.0 | <16.0 | <16.0 | <16.0 | <16.0 |
| Comparative Example 6 | 37.1 | 16.5 | 17.2 | <16.0 | <16.0 | 17.1 | <16.0 | <16.0 | <16.0 | <16.0 | <16.0 | 21.2 |
| Comparative Example 7 | 28.3 | <16.0 | <16.0 | <16.0 | <16.0 | 17.1 | <16.0 | <16.0 | <16.0 | <16.0 | <16.0 | <16.0 |
| Comparative Example 8 | 43.6 | 34.9 | 43.8 | <16.0 | <16.0 | 45.7 | <16.0 | <16.0 | 33.5 | 40.9 | <16.0 | 44.6 |
| DISTILLED WATER | | | | | | | | | | | | |
| Example 1 | 30.1 | 34.2 | 38.2 | 35.1 | 22.4 | 38.9 | 35.3 | 20.7 | 28.3 | 27.1 | 32.8 | 29.8 |
| Example 2 | 32.4 | 35.1 | 35.5 | 32.1 | 31.1 | 39.5 | 25.2 | 17.9 | 23.8 | 20.1 | 24.9 | 29.7 |
| Example 3 | 31.2 | 31.9 | 34.6 | 30.0 | 20.2 | 34.5 | 20.6 | 17.5 | 25.1 | 19.5 | 23.8 | 28.4 |
| Comparative Example 1 | 26.7 | 35.8 | 28.7 | <16.0 | <16.0 | 30.8 | <16.0 | <16.0 | <16.0 | <16.0 | 18.2 | <16.0 |

TABLE 2-continued (IMO Adhesion strength against test substrates listed in Table B)*
ADHESION STRENGTH PER IMO -180 DEG. PEEL PULL BACK, Newton per 25 mm width

| SUBSTRATE | AI | GRP | DK1 | DK2 | I.1 | IV.1 | IV.2 | V.1 | UK1 | UK2 | UK4 | UK5 |
|---|---|---|---|---|---|---|---|---|---|---|---|---|
| Comparative Example 2 | 41.2 | 21.2 | 31.6 | 16.7 | <16.0 | 33.0 | <16.0 | <16.0 | <16.0 | <16.0 | <16.0 | 33.2 |
| Comparative Example 3 | 25.4 | 17.9 | 23.6 | <16.0 | <16.0 | 31.6 | <16.0 | <16.0 | <16.0 | <16.0 | <16.0 | 16.2 |
| Comparative Example 4 | 29.5 | 27.8 | 32.3 | <16.0 | <16.0 | 32.1 | <16.0 | <16.0 | <16.0 | 28.7 | <16.0 | 32.4 |
| Comparative Example 5 | 30.9 | <16.0 | <16.0 | <16.0 | <16.0 | <16.0 | <16.0 | <16.0 | <16.0 | <16.0 | <16.0 | <16.0 |
| Comparative Example 6 | 34.6 | 16.5 | 16.8 | <16.0 | <16.0 | 18.5 | <16.0 | <16.0 | <16.0 | <16.0 | <16.0 | 20.1 |
| Comparative Example 7 | 25.8 | <16.0 | <16.0 | <16.0 | <16.0 | <16.0 | <16.0 | <16.0 | <16.0 | <16.0 | <16.0 | <16.0 |
| Comparative Example 8 | 41.2 | 31.5 | 44.6 | <16.0 | <16.0 | 45.7 | <16.0 | <16.0 | <16.0 | 20.9 | <16.0 | 39.8 |

*Tested after 16 hrs immersion in water, within 5 min. remove from water.

Based on the results in Tables 1 and 2, the retroreflective sheetings designed for use with the adhesives of the invention conformed with the USCG and IMO adhesion tests on more substrates without the aid of primers.

Although the present invention has been described with respect to specific embodiments, the invention is not intended to limit those embodiments. Rather, the invention is defined by the claims and equivalents thereof.

What is claimed is:

1. A retroreflective article in continuation with life saving devices at sea comprising:

(a) a retroreflective sheeting comprising a light-impinging surface and a non-light-impinging surface; and (b) a layer of pressure-sensitive adhesive disposed directly on at least a portion of the non-light-impinging surface, the adhesive being an amorphous hydrocarbon elastomer using a solventless hot melt process, the adhesive comprising:

(i) a rubber having a glass transition temperature ranging from about −120° C. to about −50° C. and; and (ii) a tackifier having a ring and ball softening point ranging from about 70° C. and 140° C., the adhesive comprising from about 60 to about 125 parts by weight of tackifier per 100 parts by weight of rubber, wherein said life saving device at sea having said retroreflective article adhered thereto.

2. The article in accordance with claim 1 wherein the tackifier is completely miscible with the rubber.

3. The article in accordance with claim 1 wherein the rubber is lightly crosslinked by an electron beam to provide additional molecular weight but not to the point of insolubility in toluene.

4. The article in accordance with claim 1 wherein the rubber is crosslinked with a chemical crosslinker to provide additional molecular weight but not to the point of insolubility in toluene.

5. The article in accordance with claim 1 wherein the adhesive is present at a coating weight ranging from about 80 to about 170 grams per square meter.

6. The article in accordance with claim 1 wherein the adhesive is present at a coating weight ranging from about 120 to about 170 grams per square meter.

7. The article in accordance with claim 1 wherein the adhesive layer has a liner material removably adhered to the adhesive.

8. The article in accordance with claim 1 wherein said retroreflective sheeting is selected from the group consisting of embedded lens sheetings, encapsulated lens sheetings, and structured sheetings.

9. The article in accordance with claim 1 wherein said non-light-impinging surface of the retroreflective sheeting is selected from the group consisting of i) a sealing film comprised of polymeric material selected from the group consisting of polyester, polyvinylchloride and polycarbonate, the sealing film attached to a transparent retroreflective sheeting having a substantially flat surface and a structured second surface, the structured second surface comprised of a plurality of grooves defining a plurality of peaks, ii) a metallized surface of a retroreflective sheeting having a substantially flat surface and structured second surface, the structured surface having a layer of metal thereon, and iii) a binder layer of a beaded retroreflective sheeting.

10. The article in accordance with claim 1, wherein the non-light-impinging surface of the retroreflective sheeting further contains an intermediate adhesive layer in contact with the binder layer of the beaded retroreflective sheeting.

11. The article in accordance with claim 1, wherein the rubber is selected from at least one of the following: natural rubber, polyisoprene, polybutadiene, polyisobutylene, butyl rubber, ethylene-propylene rubber, ethylene-propylene-diene monomer rubber, poly(alpha-olefin) and styrene-butadiene random copolymer and mixtures thereof.

12. The article in accordance with claim 1, wherein the rubber is natural rubber.

13. The article in accordance with claim 1, wherein the tackifier is selected from at least one of the following: terpenes and terpene phenolic derivatives, rosin and rosin derivatives, and $C_5$ and $C_9$ hydrocarbon resins.

14. The article in accordance with claim 1, wherein the tackifier is β-pinene.

15. The article in accordance with claim 1 wherein said layer of pressure-sensitive adhesive is adhered to a life vest.

16. The article in accordance with claim 1 wherein said layer of pressure-sensitive adhesive is adhered to a substrate selected from the group consisting of rubber coated cloth, vinyl film, vinyl laminated to nylon cloth, cotton coat drill, fiber glass, highly monomeric plasticized polyvinylchloride, polyolefin film, and polyolefin coated fabric.

* * * * *

UNITED STATES PATENT AND TRADEMARK OFFICE
CERTIFICATE OF CORRECTION

PATENT NO.: 5,639,530
DATED: June 17, 1997
INVENTOR(S): Miron et al.

It is certified that error appears in the above-identified patent and that said Letters Patent is hereby corrected as shown below:

In claim 1 at Column 19, line 31, the word "continuation" should read --combination--.

Signed and Sealed this

Tenth Day of February, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,639,530
DATED : June 17, 1997
INVENTOR(S) : Miron et al.

It is certified that error appears in the above-identified patent and that said Letters Patent is hereby corrected as shown below:

At column 2, line 52, the word "comporting" should read --compounding--.

At column 3, line 46, the word "comet" should read --corner--.

At column 5, line 11, the word "mounts" should read --amounts--.

At column 5, line 25, the word "compound" should read --compounding--.

At column 7, line 39, the word "pinerie" should read --pinene--.

At column 7, line 49, the word "radicalinitiated" should read --radical-initiated--.

At column 8, line 54, the word "comer" should read --corner--.

At column 8, line 62, the word "Referring" should be indented to indicate a new paragraph.

At column 8, line 64, the word "comer" should read --corner--.

At column 9, line 7, the word "comer" should read --corner--.

At column 9, line 11, the word "comers" should read --corners--.

At column 9, line 15, the word "comer" should read --corner--.

At column 9, line 31, the word "comer" should read --corner--.

At column 9, line 41, the word "comer" should read --corner--.

UNITED STATES PATENT AND TRADEMARK OFFICE
CERTIFICATE OF CORRECTION

PATENT NO. : 5,639,530
DATED : June 17, 1997
INVENTOR(S) : Miron et al.

It is certified that error appears in the above-identified patent and that said Letters Patent is hereby corrected as shown below:

At column 9, line 49, the word "comers" should read --corners--.

At column 9, line 51, the word "comers" should read --corners--.

At column 11, line 63, insert the word --front-- between the words "from" and "surface".

Signed and Sealed this

Seventeenth Day of March, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.        : 5,639,530
APPLICATION NO. : 08/491128
DATED             : June 17, 1997
INVENTOR(S)       : Miron et al.

It is certified that error appears in the above-identified patent and that said Letters Patent is hereby corrected as shown below:

Delete Title page illustrating a figure, and substitute therefor, new Title page illustrating a figure. (attached)

Delete drawing sheet 1, and substitute therefor drawing sheet 1. (attached)

Signed and Sealed this

Twenty-sixth Day of June, 2007

JON W. DUDAS
*Director of the United States Patent and Trademark Office*

United States Patent [19]

Miron et al.

[11] Patent Number: 5,639,530
[45] Date of Patent: Jun. 17, 1997

[54] RETROREFLECTIVE ARTICLES COMPRISING A NON-THERMOPLASTIC HYDROCARBON ELASTOMER ADHESIVE LAYER FOR LIFE SAVING DEVICES AT SEA

[75] Inventors: Gary R. Miron; Thanh-Huong Thi Nguyen, both of St. Paul, Minn.

[73] Assignee: Minnesota Mining and Manufacturing Company, St. Paul, Minn.

[21] Appl. No.: 491,128

[22] Filed: Jun. 16, 1995

[51] Int. Cl.$^6$ ........................ G02B 5/124
[52] U.S. Cl. ............ 428/40.1; 359/515; 359/536; 428/40.2; 428/40.9; 428/42.1; 428/67; 428/323; 428/325; 428/327; 428/328; 428/254; 428/457; 428/480; 428/492; 428/355 BL
[58] Field of Search ........................ 428/40, 343, 355, 428/354, 323, 327, 328, 325, 480, 457, 492, 494, 40.1, 40.2, 40.9, 42.1, 67; 359/515, 536

[56] References Cited

U.S. PATENT DOCUMENTS

| Number | Date | Name | Class |
|---|---|---|---|
| 2,407,680 | 9/1946 | Palmquist et al. | 88/82 |
| 2,956,904 | 10/1960 | Hendricks | 117/93 |
| 3,140,340 | 7/1964 | Weber | 88/82 |
| 3,190,178 | 6/1965 | McKenzie | 88/82 |
| 3,648,348 | 3/1972 | Freimuth | 29/200 B |
| 3,684,348 | 8/1972 | Rowland | 350/103 |
| 4,025,159 | 5/1977 | McGrath | 350/105 |
| 4,511,210 | 4/1985 | Tung et al. | 350/105 |
| 4,576,850 | 3/1986 | Martens | 428/156 |
| 4,588,258 | 5/1986 | Hoopman | 350/103 |
| 4,664,966 | 5/1987 | Bailey et al. | 428/203 |
| 4,775,219 | 10/1988 | Appeldorn et al. | 350/103 |
| 4,801,193 | 1/1989 | Martin | 350/103 |
| 4,805,984 | 2/1989 | Cobb, Jr. | 350/96.28 |
| 4,895,428 | 1/1990 | Nelson et al. | 350/103 |
| 4,896,943 | 1/1990 | Tolliver et al. | 350/105 |
| 4,906,070 | 3/1990 | Cobb, Jr. | 350/286 |
| 4,938,563 | 7/1990 | Nelson et al. | 350/103 |
| 4,950,525 | 8/1990 | Bailey | 428/164 |
| 5,056,892 | 10/1991 | Cobb, Jr. | 359/831 |
| 5,064,272 | 11/1991 | Bailey et al. | 359/541 |
| 5,066,098 | 11/1991 | Kult et al. | 359/540 |
| 5,069,964 | 12/1991 | Tolliver et al. | 428/325 |
| 5,138,488 | 8/1992 | Szczech | 359/529 |
| 5,175,030 | 12/1992 | Lu et al. | 428/30 |
| 5,183,597 | 2/1993 | Lu | 264/1.4 |
| 5,229,882 | 7/1993 | Rowland | 359/530 |
| 5,236,751 | 8/1993 | Martin et al. | 428/40 |
| 5,272,562 | 12/1993 | Coderre | 359/529 |
| 5,376,431 | 12/1994 | Rowland | 428/164 |
| 5,405,675 | 4/1995 | Sawka | 428/343 |
| 5,453,320 | 9/1995 | Harper | 428/356 |

FOREIGN PATENT DOCUMENTS

| | | | |
|---|---|---|---|
| 0 488 526 B1 | 11/1994 | European Pat. Off. | |
| 6-280221 | 10/1994 | Japan | |
| WO 94/11175 | 5/1994 | WIPO | |

OTHER PUBLICATIONS

Dictionary of Rubber, K.F. Heinisch, p. 359, John Wiley U Sons, New York (1974).

Code of Federal Regulations, 46 parts 156 to 165, Revised as of Oct. 1, 1993 Retroreflective Material for Lifesaving Equipment.

Federal Register, Solas—U.S. Coast Guard, vol 44, No. 128, Jul. 2, 1979, Rules and Regulations, Technical Specification for Retroreflective Material for Use on Life-Saving Appliances.

*Primary Examiner*—Nasser Ahmad
*Attorney, Agent, or Firm*—Gary L. Griswold; Walter N. Kim; Robert H. Jordan

[57] ABSTRACT

Retroreflective articles for life saving devices at sea are described comprising a layer of a pressure-sensitive adhesive made using a solvent-free hot melt process which employs as starting material a tackified non-thermoplastic hydrocarbon elastomer. The process employs a continuous compounding device that has a sequence of alternating conveying and processing zones.

16 Claims, 2 Drawing Sheets